(12) United States Patent
Cha et al.

(10) Patent No.: US 9,733,515 B2
(45) Date of Patent: Aug. 15, 2017

(54) BACKLIGHT UNIT

(71) Applicant: SAMSUNG ELECTRONICS CO., LTD., Suwon-si (KR)

(72) Inventors: Kyung-hoon Cha, Seoul (KR); Seung-jun Jeong, Hwaseong-si (KR); Jong-hoon Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/935,587

(22) Filed: Nov. 9, 2015

(65) Prior Publication Data

US 2016/0357065 A1 Dec. 8, 2016

(30) Foreign Application Priority Data

Jun. 5, 2015 (KR) .................. 10-2015-0079987

(51) Int. Cl.
*G02F 1/1335* (2006.01)
(52) U.S. Cl.
CPC .......... *G02F 1/133603* (2013.01); *G02F 2001/133601* (2013.01)
(58) Field of Classification Search
CPC .............. G02F 1/133602; G02F 1/133603
See application file for complete search history.

(56) References Cited

U.S. PATENT DOCUMENTS

| | | | |
|---|---|---|---|
| 8,419,257 B2 | 4/2013 | Nagatani | |
| 8,547,297 B1 | 10/2013 | Hoppenstein et al. | |
| 2007/0296650 A1 | 12/2007 | Chang | |
| 2008/0136317 A1* | 6/2008 | Rogojevic | H01L 25/048 313/504 |
| 2008/0186272 A1 | 8/2008 | Huang et al. | |
| 2010/0039023 A1* | 2/2010 | Rogojevic | H01L 51/5221 313/504 |

(Continued)

FOREIGN PATENT DOCUMENTS

| | | |
|---|---|---|
| JP | 2011-18619 A | 1/2011 |
| JP | 5198570 B2 | 5/2013 |

(Continued)

OTHER PUBLICATIONS

Communication dated Sep. 13, 2016, issued by the International Searching Authority in counterpart International Application No. PCT/KR2016/005855 (PCT/ISA/210 & PCT/ISA/237).

*Primary Examiner* — Phu Vu
(74) *Attorney, Agent, or Firm* — Sughrue Mion, PLLC

(57) ABSTRACT

A backlight unit is provided. The backlight unit includes: a first surface light source array; a second surface light source array disposed on an upper portion of the first surface light source array and arranged such that a light emitting surface of the second surface light source array is parallel with a light emitting surface of the first surface light source array; and a reflection plate disposed on a lower portion of the first surface light source array and arranged such that a reflective surface of the reflection plate is parallel with the light emitting surface of the first surface light source array, wherein the second surface light source array is stacked on the first surface light source array such that the first and second surface light source arrays are offset from each other in a plane parallel to the light emitting surfaces.

20 Claims, 27 Drawing Sheets

(56) References Cited

U.S. PATENT DOCUMENTS

2011/0141090 A1 6/2011 Hong et al.
2011/0157242 A1 6/2011 Wang
2011/0164404 A1 7/2011 Kasai
2012/0176428 A1 7/2012 Credelle

FOREIGN PATENT DOCUMENTS

KR 10-2011-0025555 A 3/2011
WO 2011025175 A2 3/2011

* cited by examiner

BACKLIGHT UNIT

CROSS-REFERENCE TO RELATED APPLICATION(S)

This application claims priority from Korean Patent Application No. 10-2015-0079987, filed on Jun. 5, 2015, in the Korean Intellectual Property Office, the disclosure of which is incorporated herein by reference in its entirety.

BACKGROUND

1. Field

Apparatuses and methods consistent with exemplary embodiments relate to a backlight unit which is capable of performing local dimming, and more particularly, to a backlight unit which is capable of performing local dimming using a surface light source, such as an Organic Light Emitting Diode (OLED).

2. Description of Related Art

Liquid Crystal Displays (LCDs) are one of the most widely used flat panel displays. An LCD is a device which displays an image using a display panel having two substrates on which electrodes are arranged and a liquid crystal layer interposed therebetween. For example, a transmissive type LCD displays an image by modulating light emitted from a backlight unit by controlling an electric field applied to the liquid crystal layer.

The image quality of the LCD depends on a contrast characteristic of the LCD. In order to enhance the contrast characteristic, a backlight dimming control method for adjusting the brightness of a backlight unit according to the displayed image has been developed. The backlight dimming control method can reduce power consumption by (adaptively adjusting the brightness of the backlight unit according to an input image. The backlight dimming method may be divided into a global dimming method for adjusting the entire brightness of a display surface, and a local dimming method for locally adjusting the brightness of a display surface. The global dimming method can enhance dynamic contrast, which is measured between a previous frame and a next frame. The local dimming method can enhance static contrast, which is difficult to improve in the global dimming method, by locally controlling the brightness of the display surface within a single frame period.

Backlight units are largely divided into direct type backlight units and edge type backlight units. Edge type backlight units have a structure in which a light source is disposed to face the side surface of a light guide panel and a plurality of optical sheets are arranged between an LCD panel and the light guide panel. Edge type backlight units can have smaller thickness than that of direct type backlight units due to their structural differences. However, in edge type backlight units, the light source irradiates light toward one side of the light guide panel and the light guide panel converts a linear light source or a point light source into a surface light source. Therefore, due to the basic structure of edge type backlight units, the light is diffused from the light guide panel and thus it is difficult to locally control the brightness. Thus, it is difficult to implement local dimming.

Compared with edge type backlight units, direct type backlight units have a structure in which a plurality of optical sheets and a diffusion plate are stacked under an LCD panel and a plurality of light sources are arranged under the diffusion plate. Direct type backlight units have the plurality of light sources arranged under the diffusion plate in a matrix formation, and enhance contrast by turning on the light source for a bright image area and turning off or turning down the light source for a dark image area.

Due to cost and heat limitations, the number of light sources to be arranged in a direct type backlight unit is limited. Because the light sources vertically rise and project light onto a transmissive type display, direct type backlight units have good light efficiency. However, because a direct type backlight unit should maintain a regular distance between the light sources for the sake of uniformity of the screen, direct type backlight units of the related art may suffer a blooming phenomenon in which an image blurs, and also, may have low contrast on a side surface since the light sources may interfere with an optical film in the backlight unit and thus light may leak.

SUMMARY

Exemplary embodiments overcome the above disadvantages and other disadvantages not described above. Also, one or more of the exemplary embodiments are not required to overcome the disadvantages described above, and an exemplary embodiment may not overcome any of the problems described above.

One or more exemplary embodiments may provide a backlight unit which can enhance a resolution and contrast in local dimming by stacking surface light sources in a direct type backlight unit.

According to an aspect of an exemplary embodiment, there is provided a backlight unit including: a first surface light source array; a second surface light source array disposed on an upper portion of the first surface light source array and arranged such that a light emitting surface of the second surface light source array is parallel with a light emitting surface of the first surface light source array; and a reflection plate disposed on a lower portion of the first surface light source array and arranged such that a reflective surface of the reflection plate is parallel with the light emitting surface of the first surface light source array, wherein the second surface light source array is stacked on the first surface light source array such that the first and second surface light source arrays are offset from each other in a plane parallel to the light emitting surfaces.

A shape and a size of a surface light source block included in the first surface light source array may be the same as a shape and a size of a surface light source block included in the second surface light source array.

The surface light source block has may have rectangular shape, a length of a horizontal side of which is N and a length of a vertical side of which is M, and the second surface light source array may be offset from the first surface light source array by as much as N/2 in the horizontal direction and as by much as M/2 in the vertical direction.

N and M may be equal.

A center of a surface light source block included in the first surface light source array may be offset from a center of a surface light source block included in the second surface light source array.

The second surface light source array may be transparent.

The reflection plate may be configured to reflect light emitted from the second surface light source array.

A surface light source block included in the first surface light source array and the second surface light source array may be an organic light emitting diode (OLED).

Surface light source blocks included in the first surface light source array and the second surface light source array may be configured to be individually turned on or turned off.

According to an aspect of another exemplary embodiment, there is provided backlight including: a first light source including first light source blocks arranged in a predetermined pattern and configured to emit light from a first surface of the first light source; and a second light source including second light source blocks arranged in the predetermined pattern and configured to emit light from a second surface of the second light source, wherein the second surface is parallel to the first surface and the second light source blocks are offset from the first light source blocks in a plane parallel to the first surface and the second surface.

A size and a shape of each of the first light source blocks may be equal to a size and a shape of each of the second light source blocks.

The shape of each of the first light source blocks and the shape of each of the second light source blocks may be rectangular.

The shape of each of the first light source blocks and the shape of each of the second light source blocks may be hexagonal.

The shape of each of the first light source blocks and the shape of each of the second light source blocks may be triangular.

Each of the first light source blocks and the second light source blocks may have a predetermined height and a predetermined width, each of the second light source blocks may be offset from a corresponding one of the first light source blocks by a first distance in an x-direction and a second distance in a y-direction in the plane parallel to the first and the second surfaces, the first distance is less than or equal to half of the predetermined width, and the second distance is less than or equal to half of the predetermined height.

Each of the second light source blocks may be an organic light emitting diode (OLED), and the second light source may be transparent.

Each of the first light source blocks may be an OLED.

The backlight may further include: a reflector; and a liquid crystal display (LCD) panel, the first light source and the second light source may be disposed between the reflector and the LCD panel.

The predetermined pattern may be a matrix.

According to an aspect of another exemplary embodiment, there is provided a backlight including: a first organic light emitting diode (OLED) array including first pixels arranged in a predetermined pattern and configured to emit light from a first surface of the first OLED array; and a second OLED array including second pixels arranged in the predetermined pattern and configured to emit light from a second surface of the second OLED array, wherein each of the first pixels and the second pixels have a same predetermined width and height, wherein the second surface is parallel to the first surface and each of the first pixels is offset from a corresponding one of the second pixels by a first distance in an x-direction and a second distance in a y-direction in an x-y plane parallel to the first and the second surfaces, wherein the first distance is less than or equal to half of the predetermined width, and wherein the second distance is less than or equal to half of the predetermined height.

According to an aspect of another exemplary embodiment, there is provided a backlight unit including: a reflection plate; a first surface light source array stacked on the reflection plate, the first surface light source array including a plurality of first light emitting elements arranged in a plane of the first surface light source array, and a light emitting surface of the first surface light source array arranged in parallel with a reflective surface of the reflection plate; and a second surface light source array stacked on the first surface light source array, the second light source array including a plurality of second light emitting elements arranged in a plane of the second surface light source array, and a light emitting surface of the second surface light source array arranged in parallel with a light emitting surface of the first surface light source array, wherein the plurality of first light emitting elements in the first plane are offset from the plurality of second light emitting elements in the second plane.

Additional and/or other aspects and advantages of the exemplary embodiments will be set forth in part in the description which follows and, in part, should be obvious from the description, or may be learned by practice of the exemplary embodiments.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE EXEMPLARY EMBODIMENTS

Figure 1:
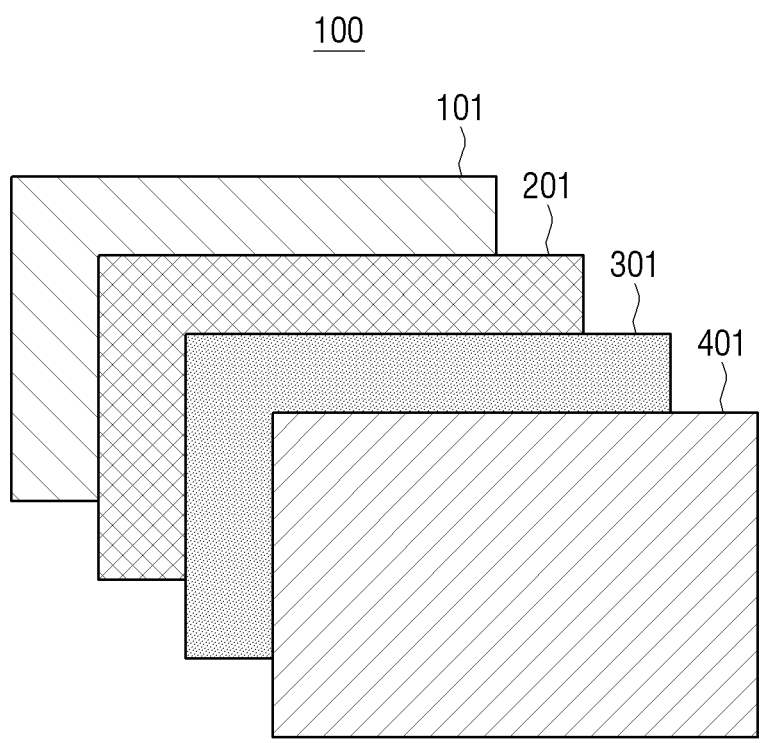
FIG. 1 is a view showing a layout of a backlight unit according to an exemplary embodiment.

Certain exemplary embodiments will be described below with reference to the accompanying drawings. However, one or more exemplary embodiments of the present disclosure are not limited to one specific exemplary embodiment and should be construed as including modification, equivalent and/or alternative of exemplary embodiments of the present disclosure. In the explanation of the drawings, similar reference numerals are used for similar elements.

The terms "have", "may have", "include", and "may include" used in the exemplary embodiments of the present disclosure indicate the presence of corresponding features (for example, elements such as numerical values, functions, operations, or parts), and do not preclude the presence of additional features.

The terms "A or B," "at least one of A or/and B," or "one or more of A or/and B" used in the exemplary embodiments of the present disclosure include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" used in one or more exemplary embodiments may modify various elements regardless of an order and/or importance of the corresponding elements, and does not limit the corresponding elements. These terms may be used for the purpose of distinguishing one element from another element. For example, a first user device and a second user device may indicate different user devices regardless of the order or importance. For example, a first element may be named a second element without departing from the scope of right of one or more exemplary embodiments, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in one or more exemplary embodiments of the present disclosure may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in one or more exemplary embodiments of the present disclosure are just for the purpose of describing particular exemplary embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the exemplary embodiments. According to circumstances, even the terms defined in one or more exemplary embodiments should not be interpreted as excluding the exemplary embodiments of the present disclosure.

Hereinafter, certain exemplary embodiments will now be explained in detail with reference to the accompanying drawings.

FIG. 1 is a view showing a layout of a backlight unit according to an exemplary embodiment.

Referring to FIG. 1, the backlight unit (e.g., backlight) 100 includes a reflection plate 101, a first surface light source array 201, a second surface light source array 301, and an LCD panel 401.

The reflection plate 101 may include an aluminum film having high reflexibility or may include a material coated with aluminum. The reflection plate 101 may be placed under the first surface light source array 201 and arranged in parallel with the first surface light source array 201. The reflection plate 101 may reflect light emitted from the first surface light source array 201 and the second surface light source array 301 towards the LED panel 401 and a front surface of the backlight unit 100.

The first surface light source array 201 may emit light. In particular, the first surface light source array 201 may emit light in a direction toward the LCD panel 401 (e.g., a forward direction). The first surface light source 201 may include a plurality of surface light source blocks which may be individually controlled to emit light (e.g., pixels). The surface light source has a predetermined area, a surface which may uniformly emit light, and has thickness which is negligible with respect to the area of the light emitting surface.

The surface light source blocks constituting the first surface light source array 201 may be implemented by using OLEDs, and accordingly, the first surface light source array 201 may be implemented by using an OLED array. However, this should not be considered as limiting, and the first surface light source array 201 may be implemented by using a Lumipanel, etc. combining a plurality of fluorescent lamps.

The OLED may be referred to as an electroluminescence (EL), and is a "self-emissive organic material" which emits light by itself using an electroluminescence phenomenon that emits light when a current flows in a fluorescent organic compound. An OLED may be driven with low voltage and may be made in a thin film form. An OLED may provide a wide viewing angle and a rapid response speed, and thus provides an image having a quality which does not deteriorate when the image is viewed from the side, and does not remain as an afterimage.

Glass is generally used as a substrate material for the OLED. However, this should not be considered as limiting. For example, when a film is used as the substrate material, a flexible display device which can be carried in a bent state may be implemented (e.g., a bendable display). The main color implementing method of the OLED includes a three-color (e.g., red, green, blue) independent pixel method, a color conversion material (CCM) method, a color filter method, etc. In addition, the OLED may be divided into a low molecular OLED and a high molecular OLED according to an amount of organic material included in the light emitting material that is used, and the driving method of the OLED may be divided into a passive matrix (PM) driving method and an active matrix (AM) driving method.

The second surface light source array 301 may emit light. The second surface light source array 301 may include a plurality of surface light source blocks. The second surface light source array 301 may be placed on the top of the first surface light source array 201 and arranged in parallel with the first surface light source array 201. That is, the second surface light source array 301 may be arranged between a front surface of the first surface light source array 201 and a rear surface of the LCD panel 401. The second surface light source array 301 may emit light in the forward direction and a backwards direction (e.g., in a direction toward the LCD panel 401 and in a direction toward the first surface light source array 201). The light emitted from the front portion of the second surface light source array 301 may be emitted in the frontward direction of the second surface light source array 301. The light emitted from the rear portion of the second surface light source array 301 may be reflected by the reflection plate 101 and thus may travel in the frontward direction of the second surface light source array 301.

The LCD panel 401 may be arranged on the front portion of the second surface light source array 301. The LCD panel 401 may be of a transmissive type and may be arranged in parallel with the second surface light source array 301 and the first surface light source array 201. An image may be displayed on the LCD panel 401.

Figure 2:
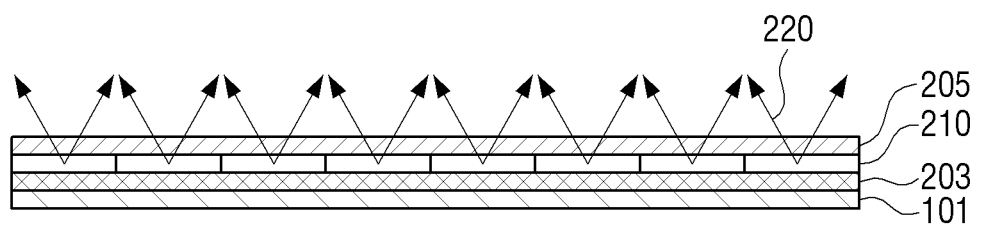
FIG. 2 is a cross section view of a first surface light source array.

FIG. 2 is a cross section view of the first surface light source array 201 shown in FIG. 1.

Referring to FIG. 2, the reflection plate 101, a lower transparent electrode 203, an upper transparent electrode 205, and a plurality of surface light source blocks 210 are illustrated.

The plurality of surface light source blocks 210 may emit light to the front portion 220. The plurality of surface light source blocks 210 may be disposed between the lower transparent electrode 203 and the upper transparent electrode 205. The transparent electrodes 203, 205 may be made of Indium Tin Oxide (ITO) glass and may be conductive and transparent. At least one of the lower transparent electrode 203 and the upper transparent electrode 205 may include a plurality of blocks having the same shape as the surface light source blocks, that is, having a shape corresponding to the surface light source blocks. That is, the transparent electrode may include a plurality of transparent electrode blocks. A wire connected with the plurality of transparent electrode blocks may be arranged in a boundary between the transparent electrode blocks. For example, when a space existing between adjacent transparent electrode blocks is 1 mm, about 30 wires may be disposed in the space. Each of the transparent electrode blocks may be connected with a power source, and, when power is applied, the surface light source blocks may emit light. The surface light source blocks 210 may be individually turned on or off. That is, the first surface light source array 201 may emit light on the basis of the individual surface light source block 210.

In addition, the first surface light source array 201 may be made of a transparent material and allow the light emitted from the second surface light source array 301 and the light reflected from the reflection plate to pass therethrough.

Figure 3:
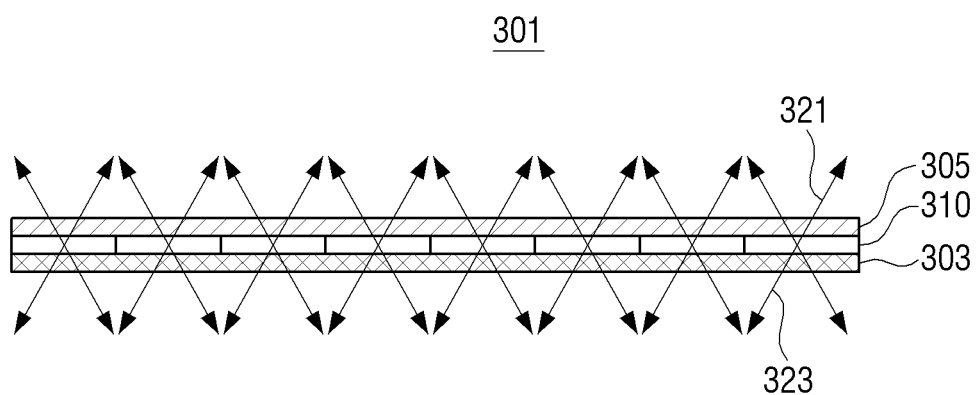
FIG. 3 is a cross section view of a second surface light source array.

FIG. 3 is a cross section view of the second surface light source array 301 shown in FIG. 1.

Referring to FIG. 3, a lower transparent electrode 303, an upper transparent electrode 305, and a plurality of surface light source blocks 310 are illustrated. The plurality of surface light source blocks 310 may emit light to the front portion 321 and the rear portion 323. The plurality of surface light source blocks 310 may be disposed between the lower transparent electrode 303 and the upper transparent electrode 305. The transparent electrodes 303, 305 may be made of Indium Tin Oxide (ITO) glass and may be conductive and transparent. At least one of the lower transparent electrode 303 and the upper transparent electrode 305 may include a plurality of blocks having the same shape as the surface light source blocks 210.

That is, the transparent electrode may include a plurality of transparent electrode blocks. A wire connected with the plurality of transparent electrode blocks may be arranged in a boundary between the transparent electrode blocks. For example, when a space existing between adjacent transparent electrode blocks is 1 mm, about 30 wires may be disposed in the space. Each of the transparent electrode blocks may be connected with a power source, and, when power is applied, the surface light source blocks may emit light. The surface light source blocks 310 may be individually turned on or off. That is, the second surface light source array 301 may emit light on the basis of the individual surface light source block 310.

In addition, the second surface light source array 301 may be made of a transparent material and allow the light emitted from the first surface light source array 201 to pass therethrough.

Figure 4:
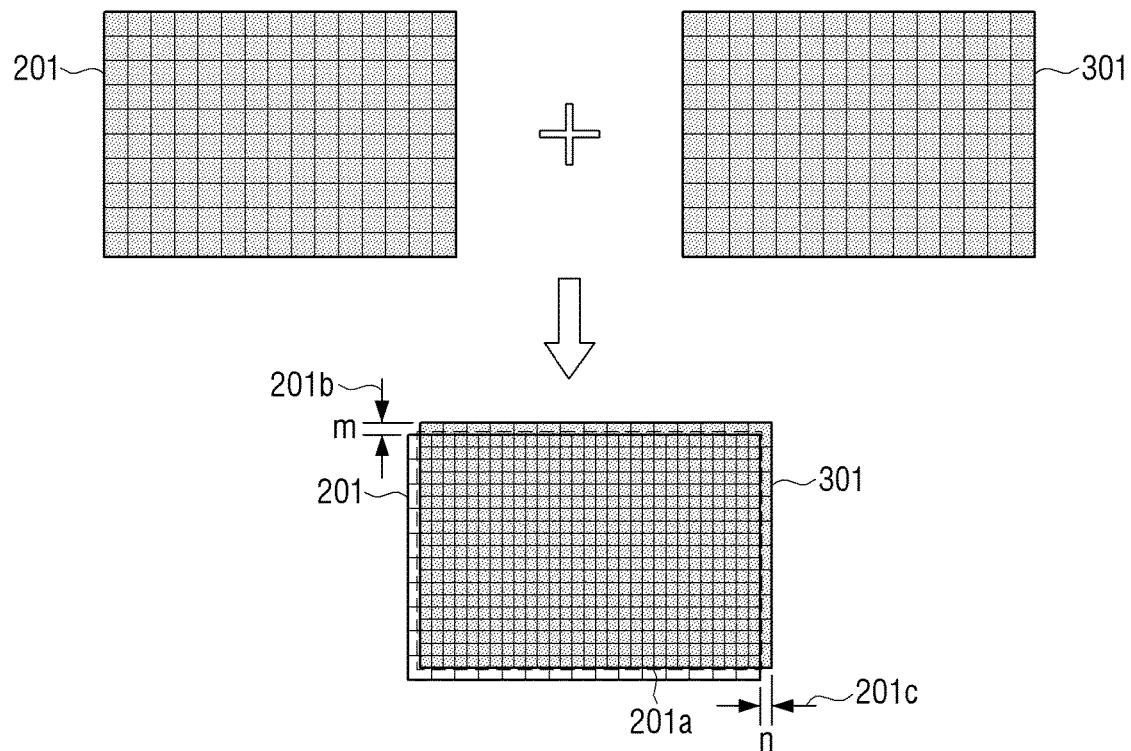
FIG. 4 is a view showing the first surface light source array and the second surface light source array which are stacked one on the other.

FIG. 4 is a view showing the first surface light source array 201 and the second surface light source array 301 which are stacked one on the other.

Referring to FIG. 4, the first surface light source array 201 and the second surface light source array 301 are illustrated. For the convenience of explanation, the first surface light source array 201 and the second surface light source array 301 are illustrated as being in a misaligned state with respect to their edges (e.g., offset). However, an area 201a illustrated by a dashed line may be the area that is used to backlight the LCD panel 401, and the entire shape may be a rectangle. The same is applied to the following explanation.

The first surface light source array 201 may include a plurality of surface light source blocks. The plurality of surface light source blocks may be individually turned on or off. The second surface light source array 301 may include a plurality of surface light source blocks.

The surface light source blocks included in the first surface light source array 201 may have the same shape and size as the surface light source blocks included in the second surface light source array 301.

The surface light source blocks included in the first surface light source array 201 and the second surface light source array 301 may be implemented in various shapes. For example, the surface light source blocks may be implemented in a polygonal shape such as a square shape, a rectangular shape, a triangular shape, a diamond shape, a pentagonal shape, etc. However, this should not be considered as limiting.

The surface light source blocks may be individually turned on or off. For example, the surface light source blocks included in the first surface light source array 201 and the second surface light source array 301 may be individually turned on or off to achieve local dimming.

The second surface light source array 301 may be stacked on the first surface light source array 201, being misaligned from the first surface light source array 201 as much as n 201a in the horizontal direction and as much as m 201b in the vertical direction (e.g., in directions perpendicular the light emitting surfaces of the first and second surface light source arrays 201 and 301).

For example, when the surface light source block is an N×M rectangle, the second surface light source array 301 may be stacked on the first surface light source array 201, being misaligned from the first surface light source array 201 as much as N/2 in the horizontal direction and as much as M/2 in the vertical direction. In addition, when the surface light source block is a square, the length N of the horizontal side and the length M of the vertical side may be the same.

The second surface light source array 301 may be placed on the top of the first surface light source array 201 in parallel with the first surface light source array 201.

Figure 5:
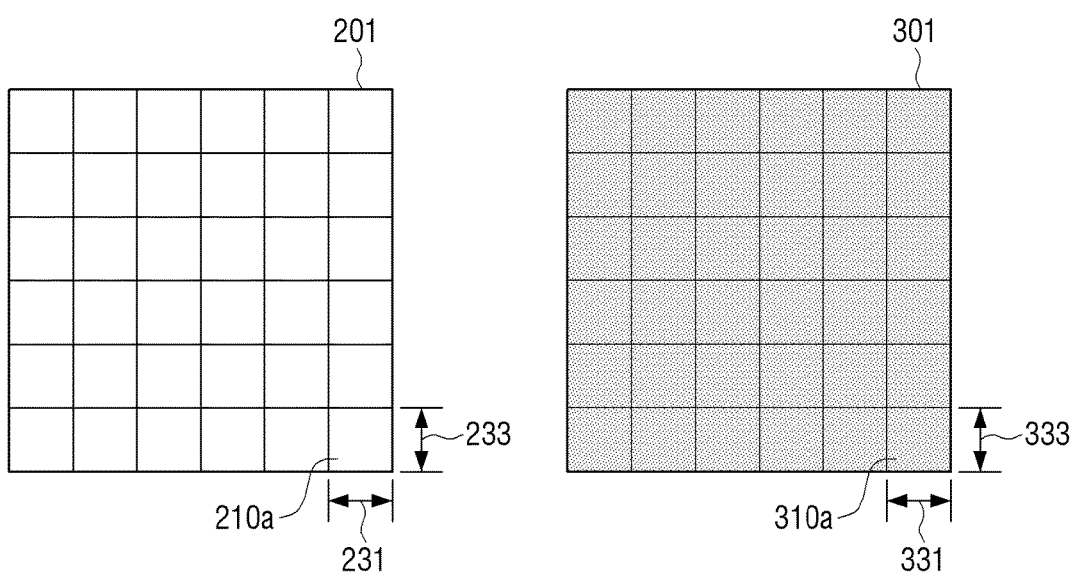
FIG. 5 is a view showing partial areas of the first surface light source array and the second surface light source array in detail.

FIG. 5 is a view showing partial areas of the first surface light source array 201 and the second surface light source array 301 in detail.

Referring to FIG. 5, the first surface light source array 201 and the second surface light source array 301 are illustrated.

The first surface light source array 201 may include a plurality of surface light source blocks. The plurality of surface light source blocks may have the same shape and the same size. The plurality of surface light source blocks may form a two dimensional array. When the individual surface light source block 210a is a square, the length 231 of the horizontal side and the length 233 of the vertical side may be the same.

The second surface light source array 301 may include a plurality of surface light source blocks. The plurality of surface light source blocks may have the same shape and the same size as the plurality of surface light source blocks included in the first surface light source array 201. The plurality of surface light source blocks may form a two dimensional array. When the individual surface light source block 310a is a square, the length 331 of the horizontal side and the length 333 of the vertical side may be the same.

In addition, the surface light source block 210a included in the first surface light source array 201 and the surface light source block 310a included in the second surface light source array 301 may have the same the shape and size.

Figure 6:
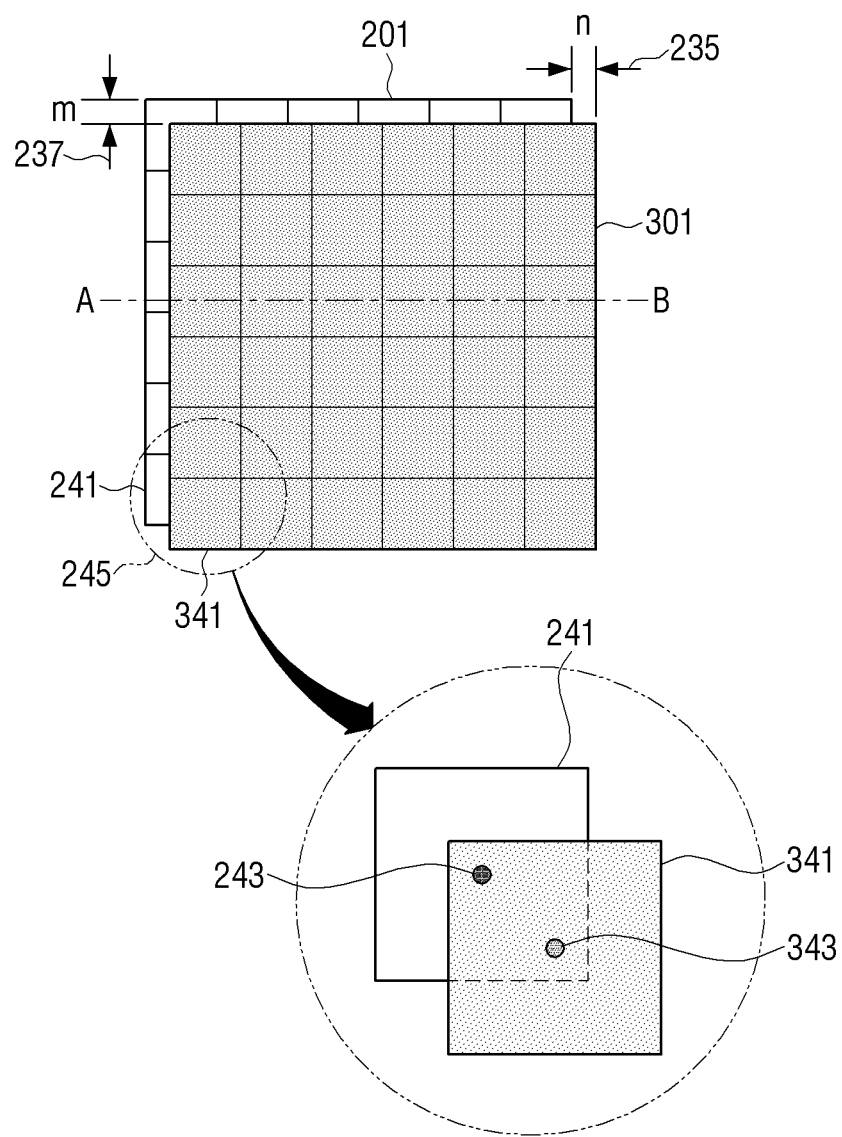
FIG. 6 is a view showing the partial areas of the first surface light source array and the second surface light source array when the first surface light source array and the second surface light source array are stacked one on the other.

FIG. 6 is a view showing partial areas of the first surface light source array and the second surface light source array when the first surface light source array and the second surface light source array are stacked one on the other.

Referring to FIG. 6, the first surface light source array 201 and the second surface light source array 301 are illustrated.

The second surface light source array 301 may be stacked on the top of the first surface light source array 201 in parallel with the first surface light source array 201. That is, a light emitting surface of the first surface light source array 201 may be parallel to a light emitting surface of the second light source array 301. The second surface light source array 301 may be stacked on the first surface light source array 201, being misaligned from the first surface light source array 201. That is, when the second surface light source array 301 is stacked on the first surface light source array 201, the center 343 of an individual surface light source block 341 included in the second surface light source array 301 may not coincide with the center 243 of an individual surface light source block 241 included in the first surface light source array 201. Put another way, the second surface light source array 301 may be stacked on the first surface light source array 201 such that the center 343 of the individual surface light source block 341 included in the second surface light source array 301 is misaligned from the center 243 of the individual surface light source block 241 included in the first surface light source array 201.

For example, the individual surface light source block included in the second surface light source array 301 and the individual surface light source block included in the first surface light source array 201 may be misaligned from each other as much as n 235 in the horizontal direction and as much as m 237 in the vertical direction. When the individual surface light source block included in the second surface light source array 301 and the individual surface light source block included in the first surface light source array 201 have an N×M size, the second surface light source array 301 may be misaligned from the first surface light source array 201 as much as N/2 in the horizontal direction and as much as M/2 in the vertical direction.

That is, the second surface light source array 301 may be stacked on the first surface light source array 201, being misaligned from the first surface light source array 201 as much as n 235 in the horizontal direction and as much as m 237 in the vertical direction.

However, this should not be considered as limiting. For example, the individual surface light source block included in the second surface light source array 301 and the individual surface light source block included in the first surface light source array 201 may be arranged such that one surface light source block is misaligned from the other surface light source block only in one of the horizontal direction and the vertical direction.

Figure 7:
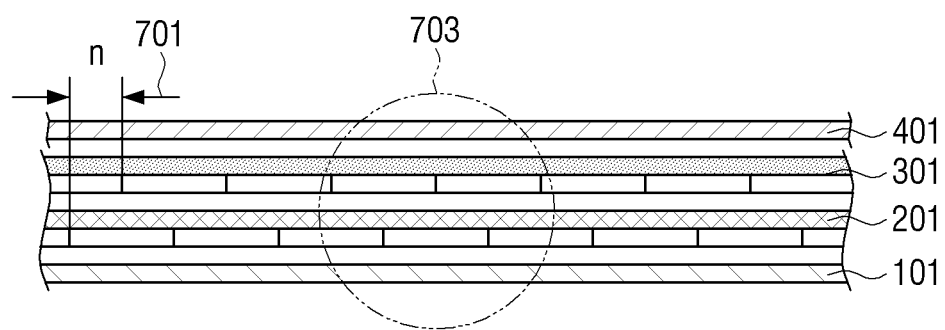
FIG. 7 is a cross section view taken along line A-B of FIG. 6.

FIG. 7 is a cross section view taken along line A-B of FIG. 6.

Referring to FIG. 7, the reflection plate 101, the first surface light source array 201, the second surface light source array 301, and the LCD panel 401 are illustrated.

The first surface light source array 201 and the second surface light source array 301 may overlap each other, but may be misaligned from each other. That is, the center of the surface light source block included in the first surface light source array 201 and the center of the surface light source block included in the second surface light source array 301 may not coincide with each other. In addition, a boundary line between the surface light source blocks included in the first surface light source array 201 and a boundary line between the surface light source blocks included in the second surface light source array 301 may be misaligned from each other. The misalignment length n 701 of the first surface light source array 201 and the second surface light source array 301 may be smaller than the length of the vertical or horizontal side of the individual surface light source block.

Figure 8:
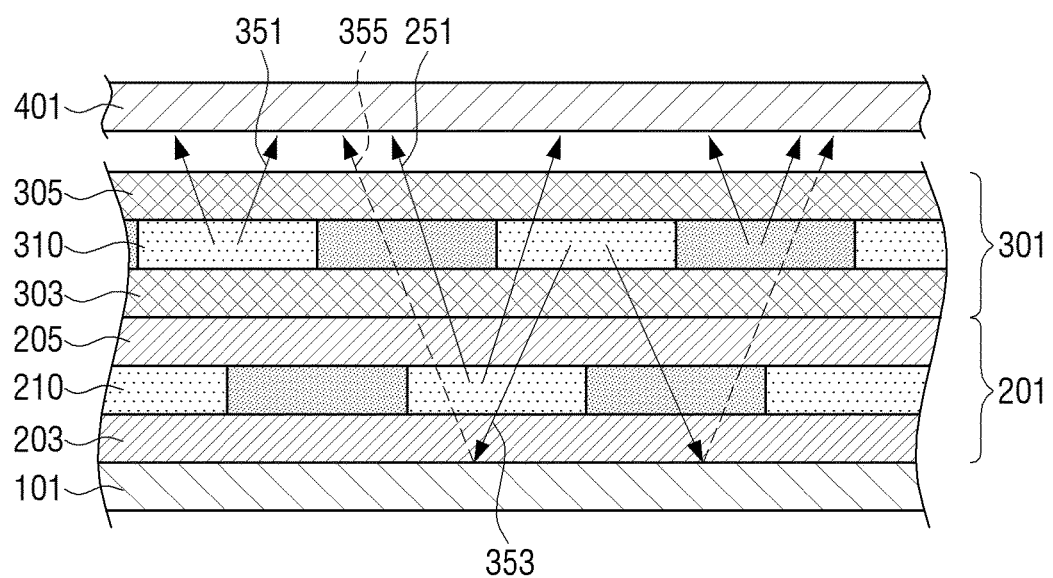
FIG. 8 is an exploded view of area 703 in FIG. 7.

FIG. 8 is an exploded view of area 703 in FIG. 7.

Referring to FIG. 8, the reflection plate 101, the first surface light source array 201, the second surface light source array 301, and the LCD panel 401 are illustrated.

The first surface light source array 201 may include the lower transparent electrode 203, the plurality of surface light source blocks 210, and the upper transparent electrode 205. When power is applied to the lower transparent electrode 203 and the upper transparent electrode 205, the plurality of surface light source blocks 210 emit light. Since at least one of the lower transparent electrode 203 and the upper transparent electrode 205 is configured on the basis of a block like the surface light source block, the plurality of surface light source blocks 210 may emit light individually.

The light 251 emitted from the surface light source blocks may travel in a direction toward the LCD panel 401 (e.g., a forward direction).

The second surface light source array 301 may include the lower transparent electrode 303, the plurality of surface light source blocks 310, and the upper transparent electrode 305. When power is applied to the lower transparent electrode 303 and the upper transparent electrode 305, the plurality of surface light source blocks 310 emit light. In addition, the plurality of surface light source blocks 310 may emit light individually. The light 351 emitted from the surface light source blocks may travel in a direction toward the LCD panel 401 (e.g., the forward direction). The light 353 emitted from the surface light source blocks may travel in a direction away from the LCD panel 401 (e.g., a backwards direction) and may be reflected by the reflection plate 101, and the reflected light 355 may travel in the forward direction towards the LCD panel 401.

Figure 9:
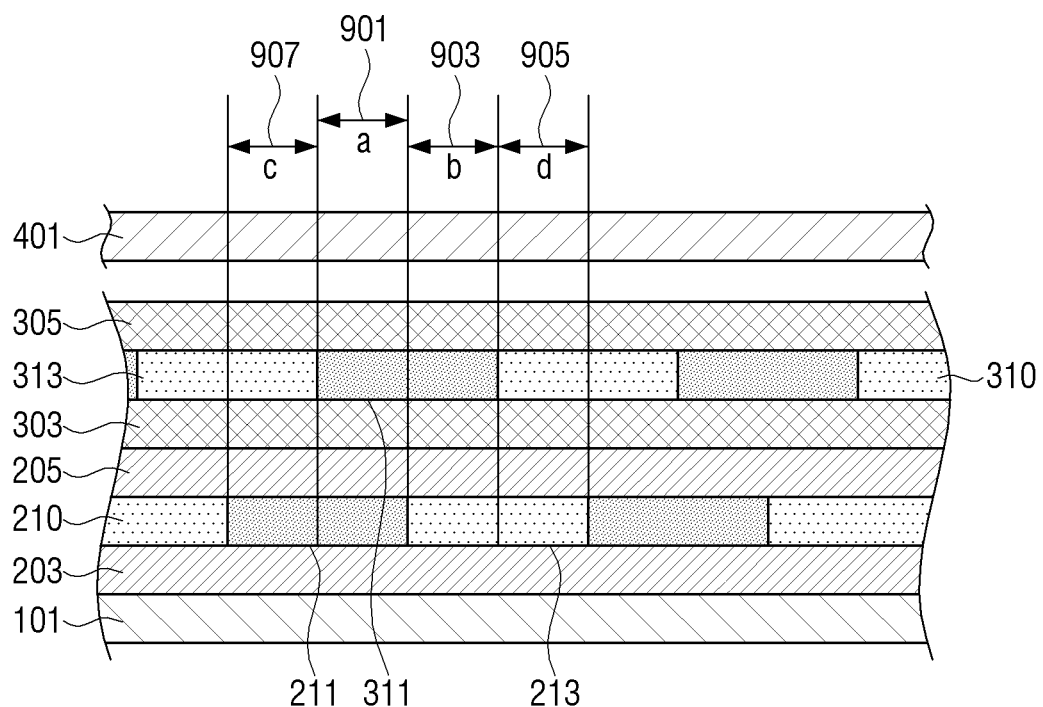
FIG. 9 is a view to illustrate a local dimming method when a first surface light source array and a second surface light source array are stacked one on the other.

FIG. 9 is a view to illustrate a local dimming method when the first surface light source array and the second surface light source array are stacked one on the other.

Referring to FIG. 9, the reflection plate 101, the transparent electrodes 203, 205 of the first surface light source array 201, the surface light source blocks 210 of the first surface light source array 201, the transparent electrodes 303, 305 of the second surface light source array 301, the surface light source blocks 310 of the second surface light source array 301, and the LCD panel 410 are illustrated. The plurality of surface light source blocks 210 included in the first surface light source array 201 and the plurality of surface light source blocks 310 included in the second surface light source array 301 may be stacked, being misaligned from one another by a predetermined length. For example, the first surface light source array 201 and the second surface light source array 301 may be stacked one on the other, being misaligned from each other as much as a length corresponding to half of the length of the individual surface light source block.

The two surface light source arrays 201, 301 are used, the surface light source blocks 210, 310 are stacked one on the other, being misaligned from each other by a predetermined length, and the surface light source blocks 210, 310 are individually turned on or off, so that a resolution and contrast can be enhanced in local dimming.

For example, when the surface light source block 211 included in the first surface light source array 201 and the surface light source block 311 included in the second surface light source block 301 emit light, and the surface light source block 213 included in the first surface light source array 201 and the surface light source block 313 included in the second surface light source block 301 are turned off, the order of brightness of areas in the LCD panel 401 is area a 901>area b 903>area c 907>area d 905. That is, the area a 901 is the brightest area and the area d 905 is the darkest area. For example, when the brightness of the area a 901 is k, the brightness of the area b 903 may be about k/2, the brightness of the area c 907 may be smaller than k/2, and the area d 905 may not emit light. That is, the brightness may be changed in four stages according to the light emission state of the surface light source blocks 210, 310.

In addition, the resolution of the surface light source blocks which can implement local dimming may increase four times.

Figure 10:
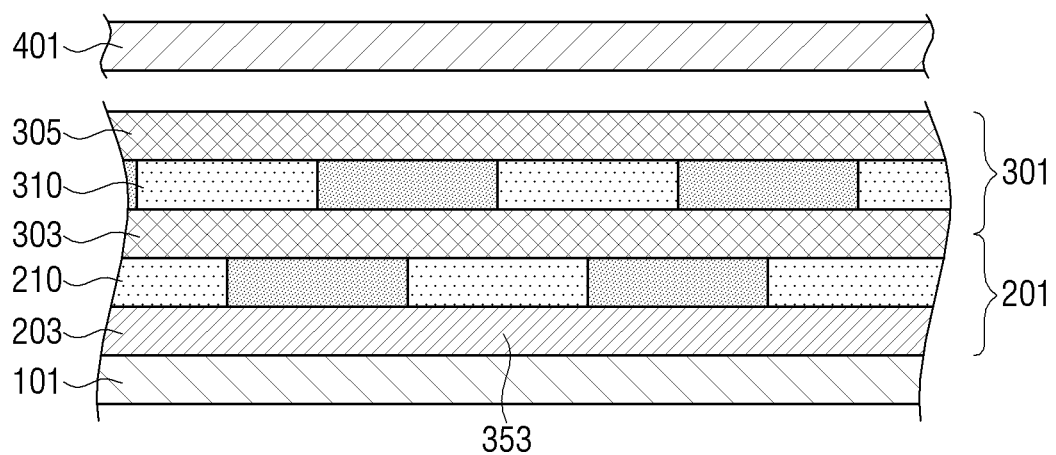
FIG. 10 is a cross section view of a structure in which a first surface light source array and a second surface light source array are stacked one on the other according to another exemplary embodiment.

FIG. 10 is a cross section view of a first surface light source array and a second surface light source array which are stacked one on the other according to another exemplary embodiment.

Referring to FIG. 10, a reflection plate 101, a first surface light source array 201, a second surface light source array 301, and an LCD panel 401 are illustrated. The first surface light source array 201 may include a lower transparent electrode 203, a plurality of surface light source blocks 210, and an upper transparent electrode 303. The second surface light source array 301 may include a lower transparent electrode 303, a plurality of surface light source blocks 310, and an upper transparent electrode 305. Herein, the first surface light source array 201 and the second surface light source array 301 may share the transparent electrode 303. That is, the upper transparent electrode 303 of the first surface light source array 201 may operate as the lower transparent electrode 303 of the second surface light source array 301.

FIGS. 11A to 11D are views showing local dimming in a surface light source block performed according to the location of an object displayed on the LCD panel 401 when a single surface light source is used.

Figure 11A:
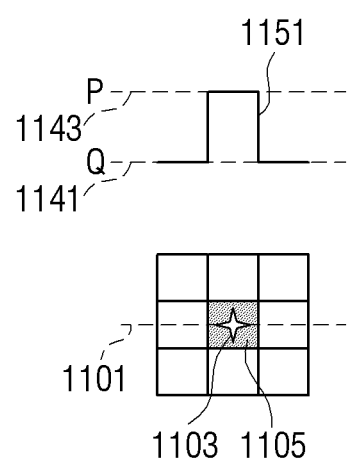
FIGS. 11A to 11D are views showing local dimming in a surface light source block performed according to the location of an object displayed on an LCD panel when a single surface light source is used.

Referring to the lower view of FIG. 11A, an object 1103 displayed on the LCD panel 401 and a surface light source block 1105 emitting light are illustrated. The surface light source may include a plurality of surface light source blocks. As shown in the drawings, the area of the LCD panel 401 on which the object 1103 is displayed is located at the center of the surface light source. In this case, one surface light source block 1105 located at the center of the surface light source emits light. A change in the brightness level in the surface light source with reference to a dashed line 1101 may be indicated by a graph 1151 shown in the upper view.

Figure 11B:
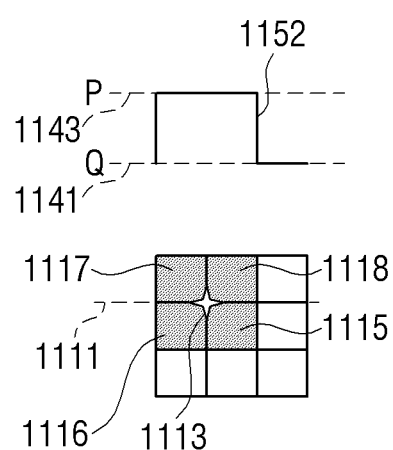

Referring to the lower view of FIG. 11B, an object 1113 displayed on the LCD panel 401 and surface light source blocks 1115, 1116, 1117, 1118 emitting light are illustrated. The surface light source may include a plurality of surface light source blocks. As shown in the drawings, the area of the LCD panel 401 where the object 1113 is displayed is located at the left upper portion of the surface light source. In this case, four surface light source blocks 1115, 1116, 1117, 1118 located at the left upper portion of the surface light source emit light. A change in the brightness level in the surface light source with reference to a dashed line 1111 may be indicated by a graph 1152 shown in the upper view.

Figure 11C:
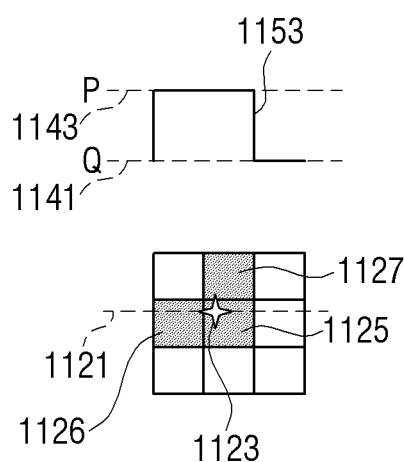

Referring to the lower view of FIG. 11C, an object 1123 displayed on the LCD panel 401 and surface light source blocks 1125, 1126, 1127 emitting light are illustrated. The surface light source may include a plurality of surface light source blocks. As shown in the drawings, the area of the LCD panel 401 where the object 1123 is displayed is located at a portion which is slightly moved from the center of the surface light source to the left and to the top. In this case, three neighboring surface light source blocks 1125, 1126, 1127 including the center of the surface light source emit light. A change in the brightness level in the surface light source with reference to a dashed line 1121 may be indicated by a graph 1153 shown in the upper view.

Figure 11D:
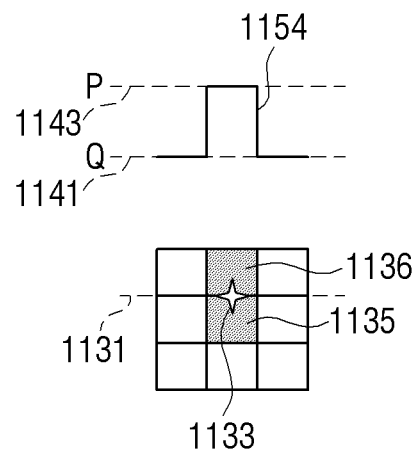

Referring to the lower view of FIG. 11D, an object 1133 displayed on the LCD panel 401 and surface light source blocks 1135, 1136 emitting light are illustrated. The surface light source may include a plurality of surface light source blocks. As shown in the drawings, the area of the LCD panel

401 where the object 1133 is displayed is located at a portion which is slightly moved from the center of the surface light source to the top. In this case, two neighboring surface light source blocks 1135, 1136 including the center of the surface light source emit light. A change in the brightness level in the surface light source with reference to a dashed line 1131 may be indicated by a graph 1154 shown in the upper view.

FIGS. 12A to 12D are views showing local dimming in a surface light source block performed according to the location of an object displayed on the LCD panel when the stacking structure of the first surface light source array and the second surface light source array is used, according to an exemplary embodiment.

Figure 12A:
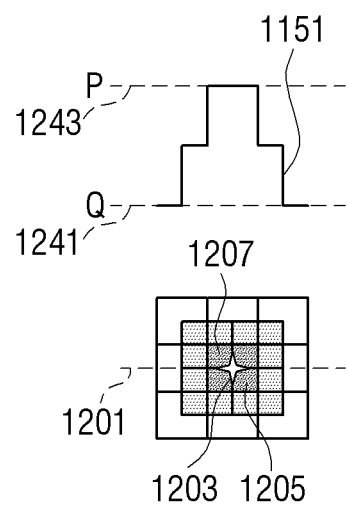
FIGS. 12A to 12D are views showing local dimming in a surface light source block performed according to the location of an object displayed on an LCD panel when a stacking structure of a first surface light source array and a second surface light source array is used, according to an exemplary embodiment.

Referring to the lower view of FIG. 12A, an object 1203 displayed on the LCD panel 401, a light emitting area 1207 of a first surface light source array 201, and a light emitting area 1205 of a second surface light source array 301 are illustrated. The first surface light source array 201 and the second surface light source array 301 may include a plurality of surface light source blocks. As shown in the drawings, the area of the LCD panel 401 on which the object 1203 is displayed is located at the center of the first surface light source array 201 and the second surface light source array 301. In this case, one surface light source block located at the center of the first surface light source array 201 and four surface light source blocks of the second surface light source array 301 emit light. A change in the brightness level in the surface light source with reference to a dashed line 1201 may be indicated by a graph 1251 shown in the upper view. Compared with FIG. 11A in which a single surface light source is used, FIG. 12A illustrates that the degree of change in the brightness level increases two times.

Figure 12B:
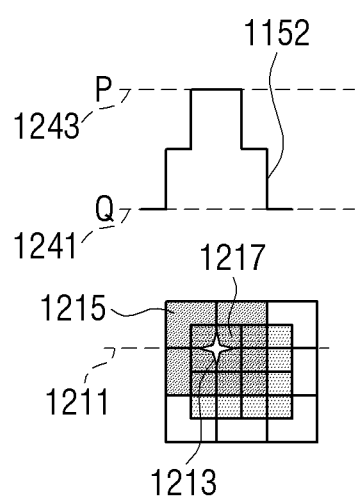

Referring to the lower view of FIG. 12B, an object 1213 displayed on the LCD panel 401, a light emitting area 1215 of the first surface light source array 201, and a light emitting area 1217 of the second surface light source array 301 are illustrated. The first surface light source array 201 and the second surface light source array 301 may include a plurality of surface light source blocks.

As shown in the drawings, the area of the LCD panel 401 on which the object 1213 is displayed is located at the left upper portion of the first surface light source array 201 and the second surface light source array 301. In this case, four surface light source blocks located at the left upper portion of the first surface light source array 201 emit light, and one surface light source block located at the left upper portion of the second surface light source array 301 emits light. A change in the brightness level in the surface light source with reference to a dashed line 1211 may be indicated by a graph 1252 shown in the upper view. Compared with FIG. 11B in which a single surface light source is used, FIG. 12B illustrates that the degree of change in the brightness level increases two times.

Figure 12C:
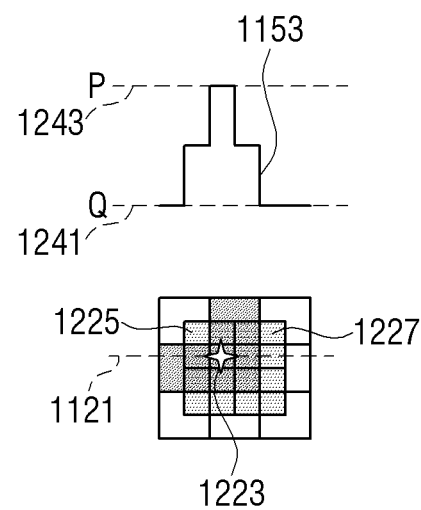

Referring to the lower view of FIG. 12C, an object 1223 displayed on the LCD panel 401, a light emitting area 1227 of the first surface light source array 201, and a light emitting area 1225 of the second surface light source array 301 are illustrated. The first surface light source array 201 and the second surface light source array 301 may include a plurality of surface light source blocks.

As shown in the drawings, the area of the LCD panel 401 on which the object 1223 is displayed is located at a portion which is slightly moved from the center of the first surface light source array 201 and the second surface light source array 301 to the left and to the top. In this case, one surface light source block located at the center of the first surface light source array 201 emits light, and one surface light source block located at the left upper portion of the second surface light source array 301 emits light. A change in the brightness level in the surface light source with reference to a dashed line 1211 may be indicated by a graph 1253 shown in the upper view. Compared with FIG. 11C in which a single surface light source is used, FIG. 12C illustrates that the degree of change in the brightness level increases two times.

Figure 12D:
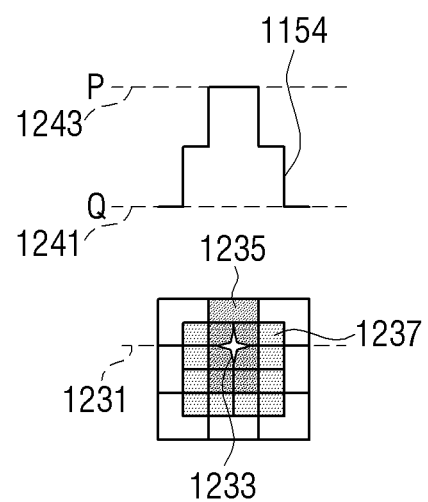

Referring to the lower view of FIG. 12D, an object 1233 displayed on the LCD panel 401, a light emitting area 1235 of the first surface light source array 201, and a light emitting area 1237 of the second surface light source array 301 are illustrated.

The first surface light source array 201 and the second surface light source array 301 may include a plurality of surface light source blocks. As shown in the drawings, the area of the LCD panel 401 on which the object 1233 is displayed is located at a portion which is slightly moved from the center of the first surface light source array 201 and the second surface light source array 301 to the top.

In this case, two surface light source blocks located at the center and upper portion of the first surface light source array 201 emit light, and two surface light source blocks located at the upper portion of the second surface light source array 301 emit light. A change in the brightness level in the surface light source with reference to a dashed line 1231 may be indicated by a graph 1254 shown in the upper view. Compared with FIG. 11D in which a single surface light source is used, FIG. 12D illustrates that the degree of change in the brightness level increases two times.

Figure 13A:
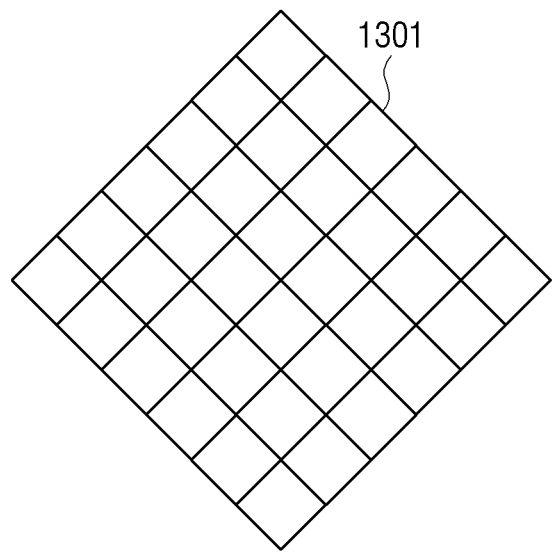
FIGS. 13A to 13C are views showing a first surface light source array and a second surface light source array which are stacked one on the other according to another exemplary embodiment.
Figure 13B:
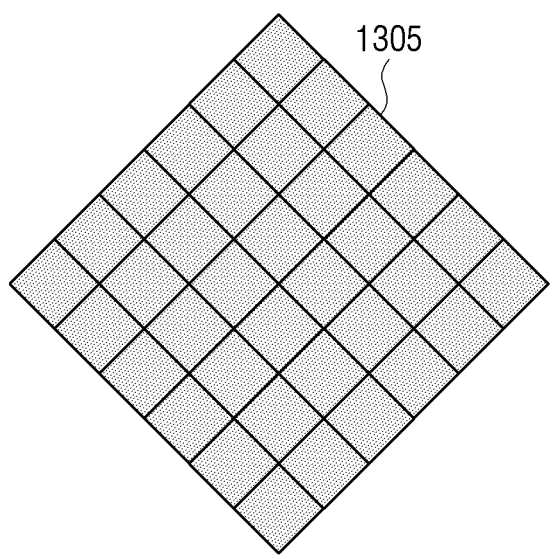
Figure 13C:
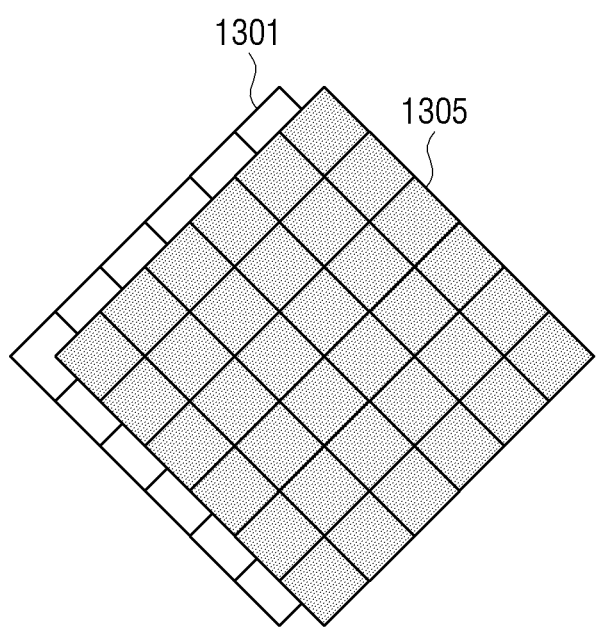

FIGS. 13A to 13C are views showing a first surface light source array 201 and a second surface light source array 301 which are stacked one on the other according to another exemplary embodiment.

Referring to FIG. 13A, the first surface light source array 1301 is illustrated.

The first surface light source array 1301 may include a plurality of surface light source blocks. The surface light source blocks included in the first surface light source array 1301 may have the same shape and the same size. For example, the shape of the individual surface light source block may be a diamond shape the four sides of which have the same length.

Referring to FIG. 13B, the second surface light source array 1305 is illustrated.

The second surface light source array 1305 may include a plurality of surface light source blocks. The surface light source blocks included in the second surface light source array 1305 may have the same shape and the same size. For example, the shape of the individual surface light source block may be a diamond shape the four sides of which have the same length.

Referring to FIG. 13C, the first surface light source array 1301 and the second surface light source array 1305 are illustrated. The first surface light source array 1302 and the second surface light source array 1305 may be stacked one on the other, being misaligned from each other by a predetermined length in the horizontal direction. For example, when the height of the individual surface light source block is n, the first surface light source array 1301 and the second surface light source array 1305 may be misaligned from each other as much as n/2 in the horizontal direction.

Figure 14A:
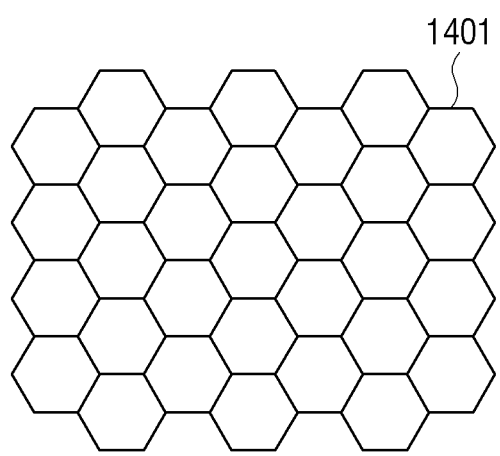
FIGS. 14A to 14C are views showing a first surface light source array and a second surface light source array which are stacked one on the other according to another exemplary embodiment.
Figure 14B:
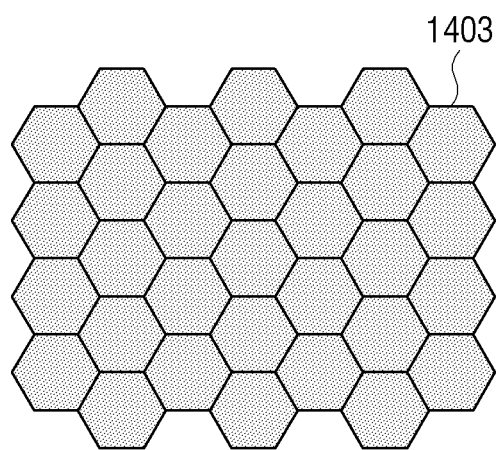
Figure 14C:
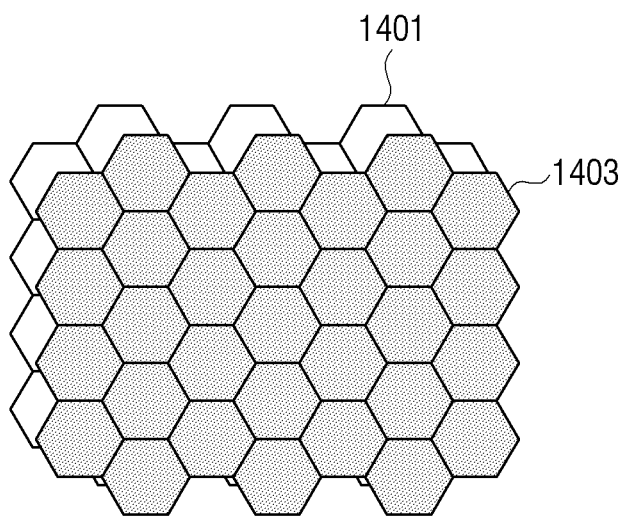

FIGS. 14A to 14C are views showing a first surface light source array and a second surface light source array which are stacked one on the other according to another exemplary embodiment.

Referring to FIG. 14A, the first surface light source array 1401 is illustrated.

The first surface light source array 1401 may include a plurality of surface light source blocks. The surface light source blocks included in the first surface light source array 1401 may have the same shape and the same size. For example, the shape of the individual surface light source block may be a hexagonal shape.

Referring to FIG. 14B, the second surface light source array 1403 is illustrated.

The second surface light source array 1403 may include a plurality of surface light source blocks. The surface light source blocks included in the second surface light source array 1403 may have the same shape and the same size. For example, the shape of the individual surface light source block may be a hexagonal shape.

Referring to FIG. 14C, the first surface light source array 1401 and the second surface light source array 1403 are illustrated.

The first surface light source array 1401 and the second surface light source array 1403 may be stacked one on the other, being misaligned from each other by a predetermined length in the horizontal direction and in the vertical direction. For example, when the length of one side of the individual surface light source block is n and the height is m, the first surface light source array 1401 and the second surface light source array 1403 may be misaligned from each other as much as n/2 in the horizontal direction and as much as m/2 in the vertical direction.

Figure 15A:
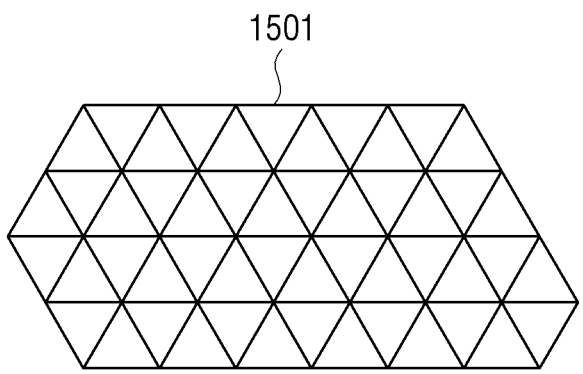
FIGS. 15A to 15C are views showing a first surface light source array and a second surface light source array which are stacked one on the other according to another exemplary embodiment.
Figure 15B:
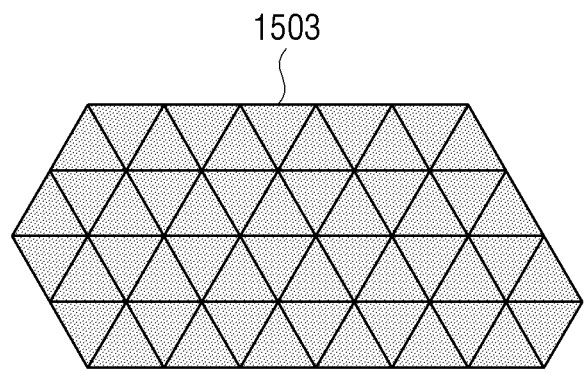
Figure 15C:
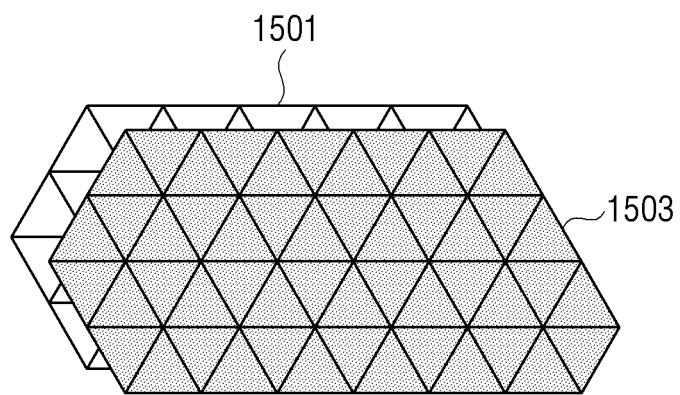

FIGS. 15A to 15C are views showing a first surface light source array and a second surface light source array which are stacked one on the other according to another exemplary embodiment.

Referring to FIG. 15A, the first surface light source array 1501 is illustrated.

The first surface light source array 1501 may include a plurality of surface light source blocks. The surface light source blocks included in the first surface light source array 1501 may have the same shape and the same size. For example, the shape of the individual surface light source block may be an equilateral triangle the three sides of which have the same length.

Referring to FIG. 15B, the second surface light source array 1503 is illustrated.

The second surface light source array 1503 may include a plurality of surface light source blocks. The surface light source blocks included in the second surface light source array 1503 may have the same shape and the same size. For example, the shape of the individual surface light source block may be an equilateral triangle the three sides of which have the same length.

Referring to FIG. 15C, the first surface light source array 1501 and the second surface light source array 1503 are illustrated.

The first surface light source array 1501 and the second surface light source array 1503 may be stacked one on the other, being misaligned from each other by a predetermined length in the horizontal direction and in the vertical direction. For example, when the length of one side of the individual surface light source block is n and the height is m, the first surface light source array 1501 and the second surface light source array 1503 may be misaligned from each other as much as n/2 in the horizontal direction and as much as m/2 in the vertical direction.

While certain exemplary embodiments have been shown and described, it should be understood that the exemplary embodiments disclosed in the specification and drawings intended to be illustrative, and not to limit the scope of the inventive concept, as defined by the appended claims. For example, although one or more exemplary embodiments describe enhancing a resolution in local dimming using two surface light sources, three or more surface light sources may also be stacked one on another, and, in this case, the resolution and contrast can be further enhanced in local dimming.

Therefore, in addition the exemplary embodiments disclosed herein, all changes or modifications derived based on the inventive concept should be construed as being included in the scope of the inventive concept.

What is claimed is:

1. A backlight unit comprising:
a first surface light source array;
a second surface light source array disposed on an upper portion of the first surface light source array and arranged such that a light emitting surface of the second surface light source array is parallel with a light emitting surface of the first surface light source array; and
a reflection plate disposed on a lower portion of the first surface light source array and arranged such that a reflective surface of the reflection plate is parallel with the light emitting surface of the first surface light source array,
wherein the second surface light source array is stacked on the first surface light source array such that the first and second surface light source arrays are offset from each other in a plane parallel to the light emitting surfaces
wherein a shape and a size of a surface light source block included in the first surface light source array is the same as a shape and a size of a surface light source block included in the second surface light source array, and
wherein light source blocks included in the first surface light source array are disposed in a same predetermined pattern as light source blocks included in the second light source array.

2. The backlight unit of claim 1, wherein the surface light source block has a rectangular shape, a length of a horizontal side of which is N and a length of a vertical side of which is M, and
wherein the second surface light source array is offset from the first surface light source array by as much as N/2 in the horizontal direction and as by much as M/2 in the vertical direction.

3. The backlight unit of claim 2, wherein N and M are equal.

4. The backlight unit of claim 1, wherein a center of a surface light source block included in the first surface light source array is offset from a center of a surface light source block included in the second surface light source array.

5. The backlight unit of claim 1, wherein the second surface light source array is transparent.

6. The backlight unit of claim 1, wherein the reflection plate is configured to reflect light emitted from the second surface light source array.

7. The backlight unit of claim 1, wherein a surface light source block included in the first surface light source array and the second surface light source array is an organic light emitting diode (OLED).

8. The backlight unit of claim 1, wherein surface light source blocks included in the first surface light source array and the second surface light source array are configured to be individually turned on or turned off.

9. The backlight unit of claim 1, wherein the surface light source block has a rectangular shape, a length of a horizontal side of which is N and a length of a vertical side of which is M, and wherein the second surface light source array is offset from the first surface light source array by N/2 in the horizontal direction and by M/2 in the vertical direction.

10. A backlight comprising:
a first light source comprising first light source blocks arranged in a predetermined pattern and configured to emit light from a first surface of the first light source; and
a second light source comprising second light source blocks arranged in the same predetermined pattern as the first light source blocks of the first light source and configured to emit light from a second surface of the second light source,
wherein the second surface is parallel to the first surface and the second light source blocks are offset from the first light source blocks in a plane parallel to the first surface and the second surface,
wherein a size and a shape of each of the first light source blocks is equal to a size and a shape of each of the second light source blocks.

11. The backlight of claim 10, wherein the shape of each of the first light source blocks and the shape of each of the second light source blocks is rectangular.

12. The backlight of claim 10, wherein the shape of each of the first light source blocks and the shape of each of the second light source blocks is hexagonal.

13. The backlight of claim 10, wherein the shape of each of the first light source blocks and the shape of each of the second light source blocks is triangular.

14. The backlight of claim 10, wherein each of the first light source blocks and the second light source blocks have a predetermined height and a predetermined width,
wherein each of the second light source blocks is offset from a corresponding one of the first light source blocks by a first distance in an x-direction and a second distance in a y-direction in the plane parallel to the first and the second surfaces,
wherein the first distance is less than or equal to half of the predetermined width, and
wherein the second distance is less than or equal to half of the predetermined height.

15. The backlight of claim 10, wherein each of the second light source blocks is an organic light emitting diode (OLED), and
wherein the second light source is transparent.

16. The backlight of claim 10, further comprising:
a reflector; and
a liquid crystal display (LCD) panel,
wherein the first light source and the second light source are disposed between the reflector and the LCD panel.

17. The backlight of claim 10, wherein the predetermined pattern is a matrix.

18. A backlight comprising:
a first organic light emitting diode (OLED) array comprising first pixels arranged in a predetermined pattern and configured to emit light from a first surface of the first OLED array; and
a second OLED array comprising second pixels arranged in the same predetermined pattern as the first pixels of the first OLED array and configured to emit light from a second surface of the second OLED array,
wherein each of the first pixels and the second pixels have a same predetermined width and height,
wherein the second surface is parallel to the first surface and each of the first pixels is offset from a corresponding one of the second pixels by a first distance in an x-direction and a second distance in a y-direction in an x-y plane parallel to the first and the second surfaces,
wherein the first distance is less than or equal to half of the predetermined width, and
wherein the second distance is less than or equal to half of the predetermined height.

19. A backlight unit comprising:
a reflection plate;
a first surface light source array stacked on the reflection plate, the first surface light source array comprising a plurality of first light emitting elements arranged in a plane of the first surface light source array, and a light emitting surface of the first surface light source array arranged in parallel with a reflective surface of the reflection plate; and
a second surface light source array stacked on the first surface light source array, the second light source array comprising a plurality of second light emitting elements arranged in a plane of the second surface light source array, and a light emitting surface of the second surface light source array arranged in parallel with a light emitting surface of the first surface light source array,
wherein the plurality of first light emitting elements in the first plane are offset from the plurality of second light emitting elements in the second plane,
wherein each of the plurality of first light emitting elements and second light emitting elements have a same predetermined width and height, and
wherein the plurality of first light emitting elements included in the first light surface light source array are arranged in a same predetermined pattern as the plurality of second light emitting elements included in the second light surface light source array.

20. The backlight unit of claim 19, wherein each of the plurality of first light emitting elements is offset from a corresponding one of the plurality of second light emitting elements by a first distance in an x-direction and a second distance in a y-direction in an x-y plane parallel to the first and the second planes,
wherein the first distance is less than or equal to half of the predetermined width, and
wherein the second distance is less than or equal to half of the predetermined height.

* * * * *